United States Patent [19]

Desbiens et al.

[11] 4,339,700
[45] Jul. 13, 1982

[54] HIGH FREQUENCY CONTROL SYSTEM USING DIGITAL TECHNIQUES

[75] Inventors: Richard L. Desbiens, Claremont, N.H.; Richard H. Gile, North Clarendon, Vt.

[73] Assignee: Ex-Cell-O Corporation, Troy, Mich.

[21] Appl. No.: 236,483

[22] Filed: Feb. 23, 1981

[51] Int. Cl.³ .............................................. G05B 1/06
[52] U.S. Cl. ..................................... 318/660; 318/661
[58] Field of Search ............... 318/600, 601, 569, 661, 318/660, 605, 618; 364/474

[56] References Cited

U.S. PATENT DOCUMENTS

| | | | |
|---|---|---|---|
| 3,340,447 | 9/1967 | MacDonald | 318/569 |
| 3,855,514 | 12/1974 | Zwitter et al. | 318/660 |
| 3,995,267 | 11/1976 | Tripp | 318/660 |
| 4,021,714 | 5/1977 | Jones et al. | 318/661 X |
| 4,023,085 | 5/1977 | Bishop et al. | 318/661 X |
| 4,107,654 | 8/1978 | Nishijima | 318/569 X |

Primary Examiner—B. Dobeck
Attorney, Agent, or Firm—Frank D. Risko; John C. Evans

[57] ABSTRACT

An apparatus for accurately controlling the rotary position of a high speed position control servo system having a servo motor which is fed by a conventional servo amplifier and drive amplifier means with a tachometer feedback to the drive amplifier. Incorporated in the system is a high frequency quadrature phasing network which receives timing signals from the servo amplifier and conditions these signals into a balanced sine cosine function which excites a rotary position transducer that is directly coupled to the motor. The high frequency sine cosine signal produces a reference feedback signal which is the difference between the actual rotor position of the motor and the sine cosine field of the position transducer stator. The error signal is fed back to the servo amplifier and is conditioned through a transformer, pre-amp and filter means and then fed into the servo amplifier means to tract the servo motor.

5 Claims, 5 Drawing Figures

QUADRATURE PHASING CIRCUIT (ITEM #16)

HIGH FREQUENCY CONTROL SYSTEM USING DIGITAL TECHNIQUES

BACKGROUND OF INVENTION

I. Field of Invention

This invention relates to the digital servo control or servo mechanism field, and more particularly, to an improved digital servo control for operating a servo motor having a resolver feedback element for controlling accurately the position of a shaft, such as in a servo motor, and to use this angular shaft output to drive a ball screw mechanism.

II. Description of the Prior Art

The essential features of a servo mechanism are the servo motor itself, the drive amplifier, and the servo amplifier which can be either an analog or a digital type unit. The servo amplifier will feed the drive amplifier which is nothing more than a high current output and voltage source for operating the motor usually at varying DC voltages. The system will normally have a tachometer feedback which will continuously provide a velocity signal to the drive amplifier. This signal assists to control the rotary position and speed of the output shaft. In addition, a position feedback device such as a resolver or an encoder are sometimes used which feed directly back to the servo amplifier and provide signal information as to the actual position which the motor shaft has attained. As noted earlier, the different types of systems can be analog or digital. The analog system relies on the actual value of voltages and currents to control the output of the servo amplifier and the drive amplifier in order to control the position, speed, and acceleration of the servo motor. Most recently, digital techniques have been adapted in order to get a greater sensitivity of control over the servo mechanisms. One such device is shown in U.S. Pat. No. 3,340,447 to MacDonald, titled Digital Servo Mechanism. This patent details the use of digital signals to position and output shaft which has a feedback scheme and other circuit means for instructing the drive amplifier that it has attained the correct position or speed and provides continuous signals for operating a servo motor.

Currently available on the market is a servo amplifier built by Hyperloop Incorporated of Bridgeview, Ill. This device is designed to work with a servo motor drive system having a tachometer and resolver feedback network. The resolver tells the control system or the servo amplifier the exact position of the output shaft. This system called the MEGA-HIGHSTEP has the unique capability over other similar devices on the market in that it is capable of moving at high rates of speed and still provide fine positioning accuracy. For example, this device can handle data at the rate of 1,000,000 bits per second or 1 Megahertz (MHz). Whereas, most other devices on the market are in the order of 100,000 to 200,000 bits per second or 0.1 to 0.2 MHz. This device offered an improvement of from 5 to 10 times the speed and accuracy combination of previous type devices. However, the resolver feedback mechanism in the system has a large error associated with it which resulted in excessive positioning errors when used in conjunction with a slide system in a machine tool. In such a machine tool system, the output shaft of the servo motor feeds a ball screw and thereby positions a machining table or machining element. The error occurring in the system is caused from the basic design of the resolver and the resolver manufacturer cannot provide any better resolution than the current technology allows at this time. In addition to these errors, the feedback package connecting to the servo motor usually has gears coupling the resolver to the motor shaft. These gears, even though they are of high precision and quality, introduced additional errors into the positioning system. Obviously, because the gears are subject to wear, continuous use of this type of system will only increase the error of the overall system as time goes on. Unfortunately, this state of the art technology left the inventors with a positioning system far too inaccurate to be useful in a high precision machine tool application involving a grinding operation.

This invention is a new and novel method to achieve more accurately the angular position of the output shaft of a servo motor and thereby increase the accuracy of the position of a ball screw device used for the linear translation or position of a slide on a machine tool table. This new device is a rotary position transducer commercially called an INDUCTOSYN ® device and is manufactured by Farrand Controls of Valhalla, N.Y. This is connected to the output shaft of the motor directly and has the capability of providing a very high resolution or feedback signal which has not been used before with a servo amplifier in such a system application. Since the transducer is connected directly to the motor shaft, no gearing wear or other inaccuracies are introduced in the system.

An object of this invention was to utilize a quadrature phasing network to develop two specific signals to feed the rotary position transducer. Another object of this invention was to shape and condition the pulses coming from the quadrature phasing network which ultimately fed a balance amplifier for maintaining the linearity of the signal into the Inductosyn or rotary position transducer.

Another object of this invention is to pick off the feedback signal and amplify that signal through a pre-amplifier and filter and feed it into the servo amplifier. A further object of this invention is to utilize the angular position of the output shaft in conjunction with a ball screw mechanism for operation with a machine tool element. An object of this invention is to produce a sine and cosine signal for energizing the rotary position transducer coils. An object of this invention is to determine the phase shift between the rotor and stator of the rotary position transducer and detect and amplify that phase difference through a pre-amp and band pass filter into the servo amplifier. Another object of this invention is to convert the digital feedback signal into a sinusoidal signal which will feed the servo amplifier.

SUMMARY OF THE INVENTION

A specific embodiment of our invention comprises an apparatus for controlling the axial position of a high speed position control system having a servo amplifier and drive means, a servo motor with a tachometer and rotary position feedback means, a high frequency quadrature phasing network which receives a continuous timing or clock signal from the servo amplifier; the phasing network feeds a pulse shaping and conditioning circuit which is connected to a balancing circuit that equalizes the currents in the stators of the rotary position feedback device. A position signal from the rotary position feedback device is conditioned and amplified through a pre-amplifier and filter circuit, and subsequently fed to the servo amplifier means. This control system incorporates the use of high frequency digital signal techniques which allows a greater precision and accuracy in the final adjustment of the servo motor. The improvement in performance of this invention is an order of magnitude better in precision than the existing systems on the market.

The embodiments which are incorporated herein will best be understood by reference to the following detailed description together with the accompanying drawings of a preferred embodiment thereof.

DESCRIPTION

Figure 1:
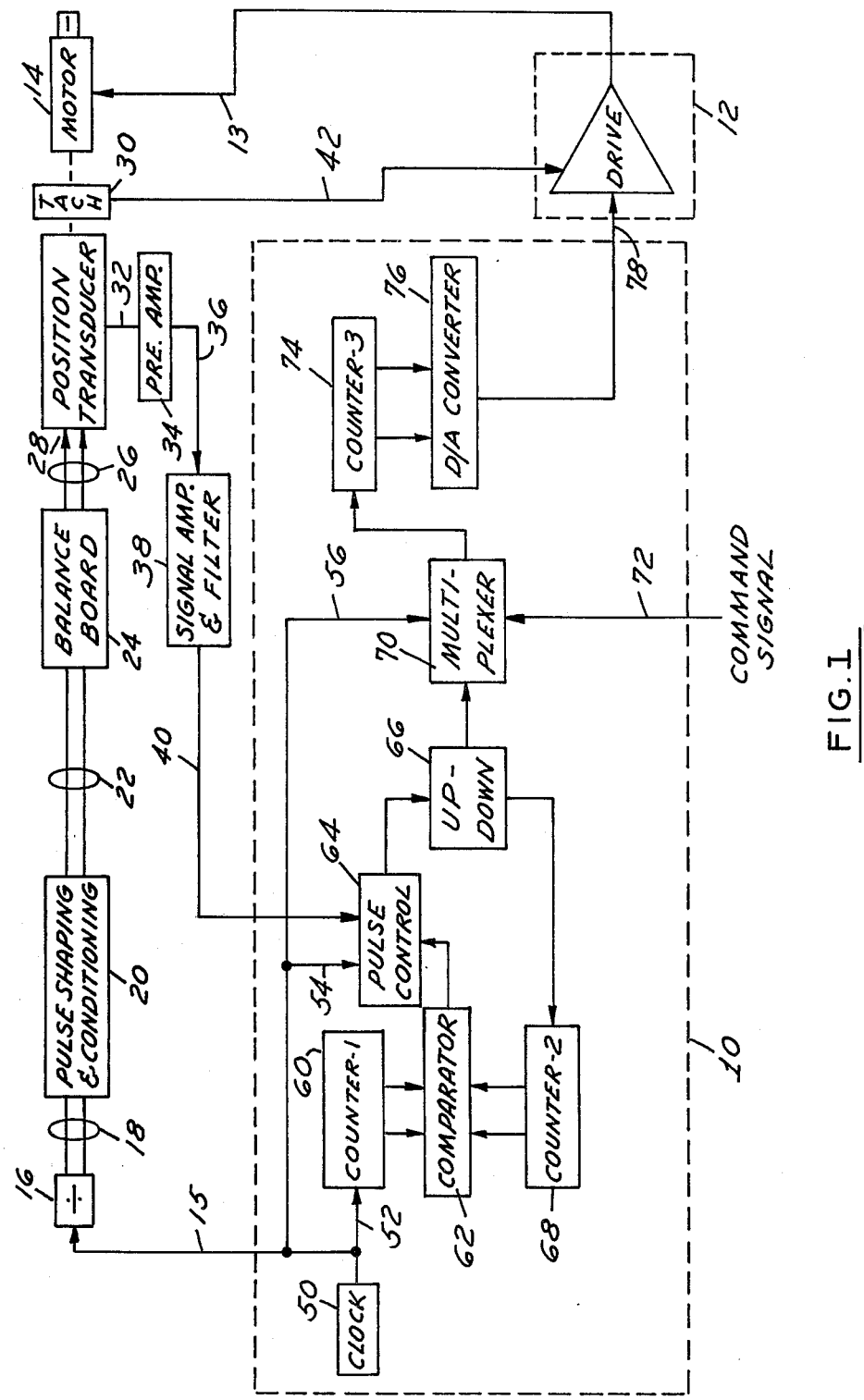
FIG. 1 is an overall block diagram showing the various elements which make up the system.

Referring now to the drawings, FIG. 1 shows in schematic form and block diagram representation, the essential elements of the overall system in accordance with our invention. As schematically indicated, the servo amplifier 10, enclosed in the dotted box of FIG. 1, has its output connected to a servo drive amplifier 12. The output of the servo amplifier 12 is connected via line 13 to the servo drive motor 14. Also coming from the servo amplifier 10 is a clock output line 15 which feeds the quadrature phasing network 16 where it is digitally broken down into a sine and cosine signal. This signal feeds through the phasing line 18 into a pulse shaper 20 and the balance board 24. The balanced board signals are divided into sine and cosine signals which are fed across line 26 into the rotary position transducer 28. All of these elements will be described in greater detail in this specification. It should be noted, however, that the rotary position transducer or Inductosyn 28, the tachometer 30 and the drive motor 14 are all on a common shaft. The tachometer is feeding, via line 42, directly into the servo drive amp 12. The rotary position transducer signal is fed back through a pre-amp 34 and a signal amp and filter circuit 38 on line 40 to the servo amplifier 10.

Referring now to FIG. 1 and the area within the servo amplifier 10; this section within the dotted lines represents a MEGA-HIGHSTEP servo amplifier which is available from the Hyperloop Company of Bridgeview, Ill. The block diagram form is an approximation of the unit which Hyperloop refers to as the Hystep and its overall function as a servo amplifier is fairly straight forward. The unit operates by mixing positioning information on the feedback line 40 through an up/down counter 66 with command signal information on line 72 in multiplexing circuit 70. This information via a D/A converter 76 feeds the servo amplifier 12 and determines how fast the servo motor 14 should move in order to obtain or maintain a desired system position or performance. The signals within the servo amplifier 10 are all digital signals with the exception of the servo drive line signal on line 78 feeding the servo drive amplifier 12 which is an analog signal. This analog signal range is ±10 volts and determines the rate and direction of the servo motor. The servo drive power supply 12 is also a commercially available item from Hyperloop sold under the tradename, HYAMP-III ®. As the servo motor 14 moves, the tachometer 30, which is physically attached to the motor shaft, feeds back a velocity signal via line 42 to the servo drive amplifier 12. This feedback signal references the velocity of the motor shaft directly to the drive amplifier so that it can, if necessary, adjust the drive amplifier signal to properly maintain the correct the speed of the servo motor. Also attached to the shaft of the servo motor is the rotary position transducer 28. This device, known commercially as an Inductosyn, is an inductive type synchronous device. This unit develops a signal which represents the instantaneous angular position of the drive motor. This signal is fed back through a pre-amp 34 over line 32 and from the pre-amp on line 36 to a signal amplifier and filter 38. From the amplifier and filter 38, the signal is then fed on line 40 into the servo amp 10 where it goes into pulse control circuit 64. The position transducer 28 requires an excitation signal which is derived from the balance board 24. This signal is fed via lines 26 and consists of two square waves which are phase shifted 90° from each other. This known phase relationship is referenced to the rest of the system. The feedback signal on line 40, which feeds the servo amp 10, essentially closes the loop to maintain the system stability and positioning.

Referring back now to FIG. 1, a clock function generator 50 produces a 10 MHz signal which is fed on line 52 into counter 60 and also on line 15 into the quadrature phasing network 16. This signal is a square wave logic level pulse which is distributed through the servo amp to the counter no. 1, 60, to the pulse control 64, and to the multiplexer 70 circuit. This timing relationship is very important in order to derive the necessary internal signals and maintain the phase relationships between them after the signal leaves the quadrature phasing network 16 and the pulse shaper 20. These circuits will be discussed in detail later on and are referenced in FIGS. 2a and 2b.

Referring now again to FIG. 1 and the area within the dotted lines or the servo amp 10. The clock signal on line 52 goes into counter no. 1, element 60 which is a 3 decade counter and just counts the number of clock pulses coming into it. The same clock pulses go up line 15 into a dividing circuit which ultimately determines the phase relationship for the excitation of the rotary transducer 28. The transducer feedback signal coming in on line 40 goes through a zero crossing once every cycle of excitation. The phase relationship of that zero crossing is most critical and referenced in the pulse control 64. For example, when shifting from the original zero crossing by rotating the transducer 28 in a particular direction, the feedback signal will cause pulses to start flowing out of the control module 64 into the up-down control 66. The up-down control basically determines the direction in which to go in order to activate counter 2, element 68. When a comparison between counter 1 and counter 2 is made, the comparator 62 will stop the flow of pulses out of pulse control 64. Thus, the pulses which flow from the pulse control 64 and the up-down control 66 are proportional to the phase relationship between the position of the transducer 28 and where counter no. 2, element 68 is referenced. Counter 2 being the circuit that tracks the transducer. These pulses that are being counted off as the transducer 28 moves are also fed into multiplexer 70 where they are mixed or multiplexed with the command pulses coming in on line 72. They are then fed from the multiplexer 70 to counter no. 3, element 74. This digital count, which is then in item 74, is a representation of the following error of the motor or the difference between the number of pulses that have come in on command signal line 72 subtracting away from it the number of pulses that have been executed through the feedback line 40 from the transducer 28. Thus, the count at any time in counter no. 3, element 74, is the following error or the number of pulses backlogged that have yet to be executed. This backlog is higher depending upon the speed at which the motor operates and is converted into an analog signal through the D/A converter 76 which in turn develops the analog signal to feed the servo drive amplifier 12. This then completes the feedback loop with the drive amplifier 12 feeding the servo motor on line 13.

This description and diagram in FIG. 1 is a general representation of how the system works. It does not include features which are essential for total operation such as fault sensing circuitry which would shut down the system if there was a fault, or the start up circuitry for initializing various counters and so forth which are necessary to zero the system out when first started so that an accurate starting point is known. These circuits and elements are well known in the art and a detailed discussion here is not required.

Figure 2A:
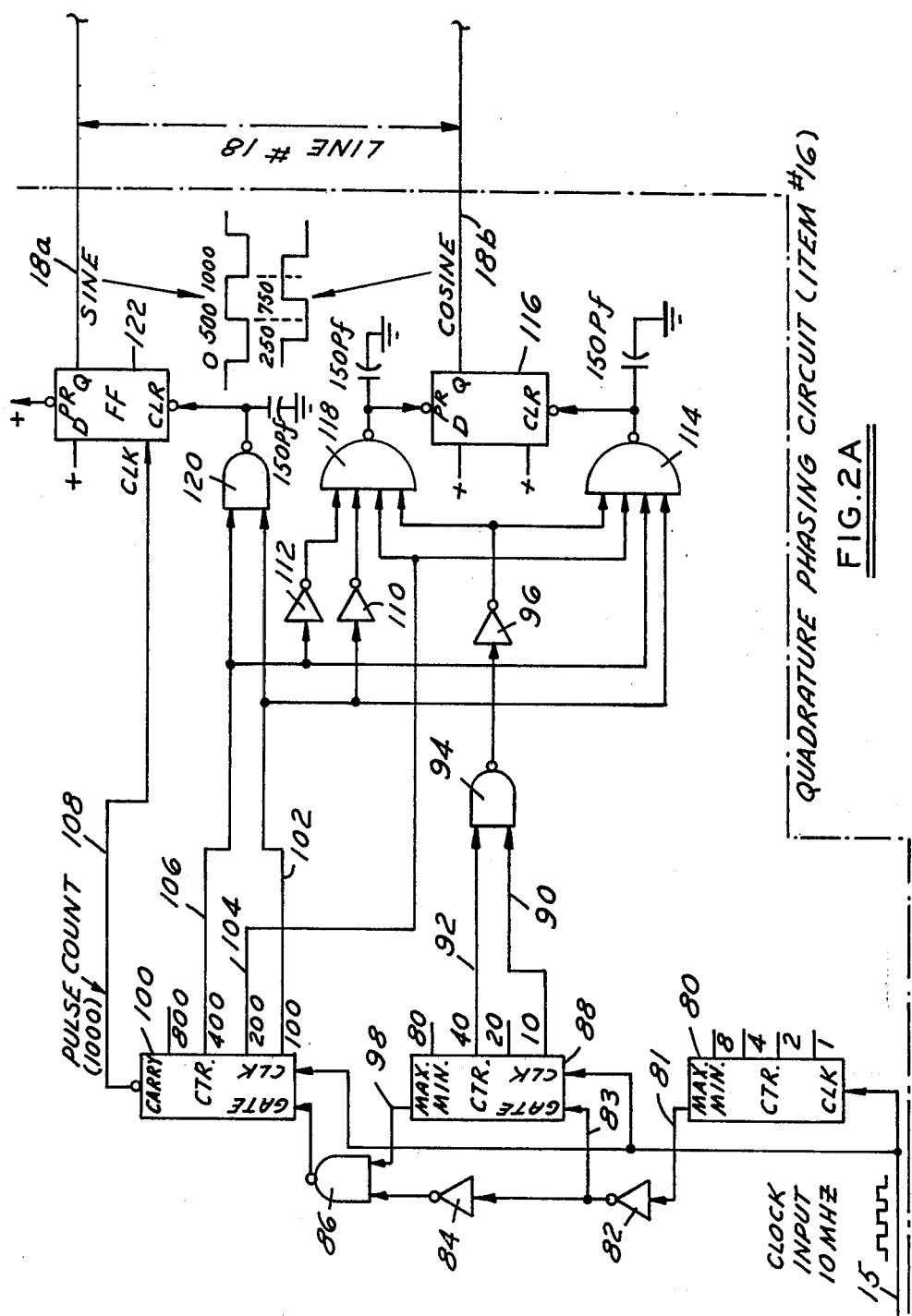
FIG. 2A is a logic diagram showing the interconnections of the quadrature phasing circuit.

The quadrature phasing network 16 is shown in FIG. 2A. The basic circuitry consists of a series of counters, functional logic elements, and two flip-flop circuits. The input signal or clock, operating at 10 MHz coming from the servo amplifier, is eventually converted into a sine cosine functional signal having outputs on line 18. Looking at the circuit in detail, counters 80, 88 and 100 are a series of cascading decade counters. Line 15 has the clock input signal on it operating at 10 MHz feeds each of the decade counters. These counters divide the input clock frequency into the basic excitation frequency which is used in the rotary transducer 28 and is shown in FIG. 1. The purpose of these counters is to properly divide the input clock frequency, i.e, 10 MHz, untimately into a thousand pulse counts on line 108 which, in essence, establishes the resolution or improved sensitivity of the system. Counter 80 also feeds an inverter 82, 84 and a NAND gate 86. This circuitry provides a "look ahead" feature for the logic elements so that they can quickly set up the enabling signals for the next most significant counter. Counter 80 is a "ones" counter which has an output on line 81, every 10 counts of the 10 MHz clock. This signal, on line 81, is then operating at 1.0 MHz. This signal feeds the inverter 82 which then gates counter 88 in conjunction with the clock signal. It should be noted here that all the logic elements operate on a "low" enable signal. Counter 88 is a "tens" counter and develops a signal on line 90 for every 10 clock counts when the enable signal to the gate on line 83 is low. This actually takes 20 clock counts at the clock frequency of 10 MHz. This line 83 signal frequency is 500 KHz. The signal on line 92 at every 40 counts is 100 KHz. The output from counter 88 on line 98 occurs every 100 counts and is at 100 KHz. This signal is then fed to NAND gate 86 along with the one mega-hertz signal from counter 80. The output signal from the NAND gate 86 feeds counter 100 along with the input clock frequency of 10 MHz. This counter 100 is a "hundreds" counter and develops a series of signals on the various output lines; the signal on line 102 is operating at 50 KHz; the 200 count signal on line 104 is operating at 20 KHz; the 400 count signal on line 106 is 10 KHz and the output of this counter, on line 108, is operating at 10 KHz giving a 1,000 count per cycle signal.

The signals from counter 88 on lines 90 and 92 are fed into NAND gate 94 and then through an inverter 96 and ultimately to the NAND gates 114 and 118. The signals from counter 100 on line 102 and 106 feed NAND gate 120 which ultimately feeds flip-flop 122 on the clear input. Both of the signals on line 102 and 106 feed the NAND gates 114 and 118. The signals into NAND gate 114 are direct. Whereas, the signals into NAND gate 118 are inverted by inverters 110 and 112. The signal from counter 100 on line 108 is fed into the clock input of flip-flop 122. This signal when combined with the clear signal feeding from NAND gate 120 produces an output on the Q side of the flip-flop on line 18a which becomes a pulse train that is subsequently phased into a sine function when related to the signal on line 18b. The input signals from NAND gates 114 and 118 are fed into flip-flop 116 with the signal from NAND gate 114 on the clear input and the signal from gate 118 on the preset input which then combine to produce the square wave pulse train on line 18b coming off the Q output of flip-flop 116. Because of the timing delay this signal becomes a cosine function when related to the signal on line 18a. The purpose of the circuitry, as can be noted in FIG. 2A, is to derive a sine and cosine square wave function or logic output, which has 1000 counts/cycle over a total time period. This signal frequency or time period is 10 KHz. As can be seen, the sine function on line 18a begins at zero count time with a negative going signal and reverses at 500 counts and reverses again at 1000 counts. The cosine function on line 18b is triggered via the logic circuitry to go negative at 250 counts, reverse polarity at 750 counts and again reverse polarity at 1,250 counts. These two signals when combined form a sine cosine function that becomes the excitation signal for the rotary transducer. The signal that is developed eventually feeds into the transducer and becomes a 10 KHz 90 degrees phase shifted sine/cosine signal.

Figure 2B:
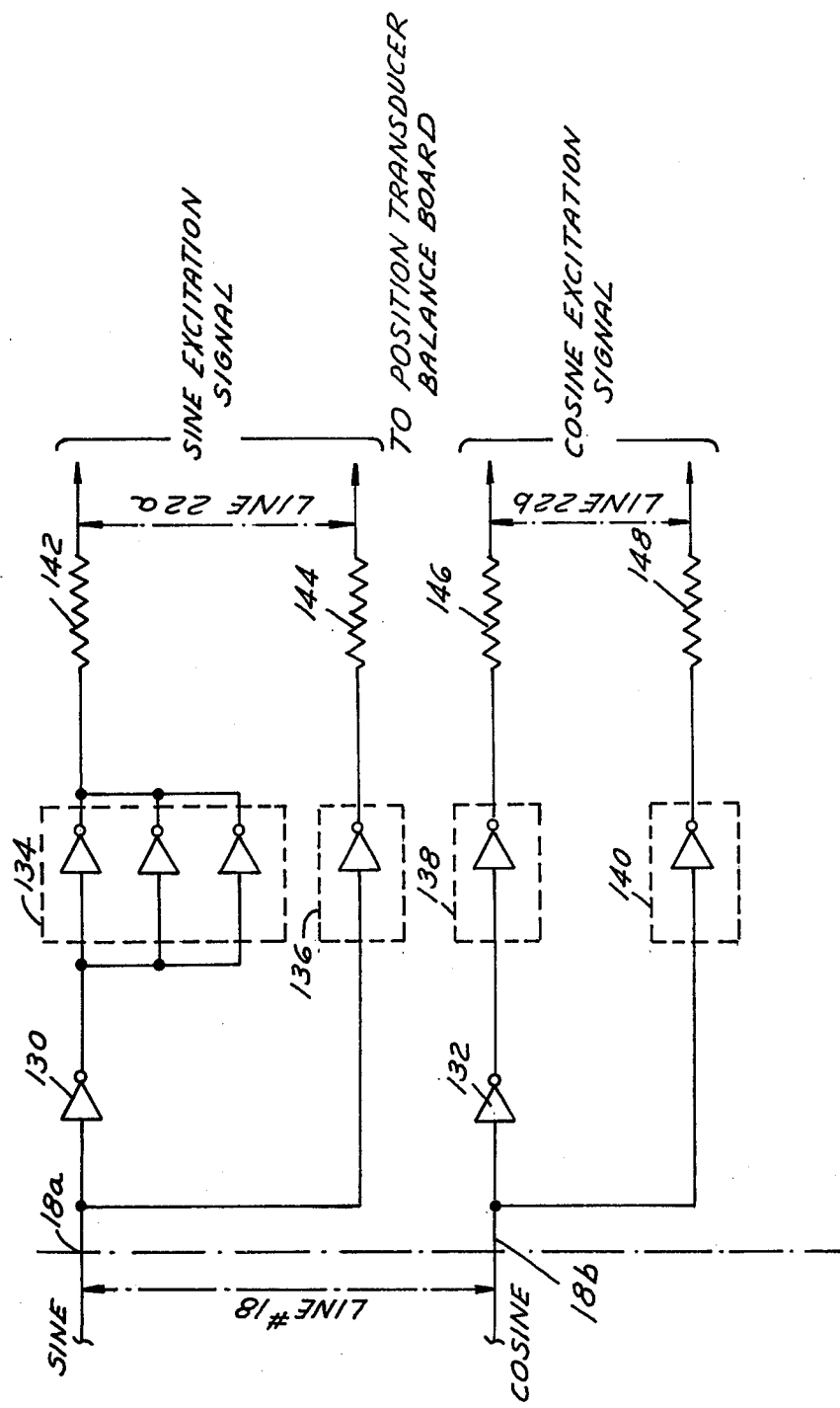
FIG. 2B is a logic diagram showing the interconnections of the pulse shaping and conditioning circuit.

Referring now to FIG. 2B the output on line 18 is fed into the circuits, shown in FIG. 1, as the pulse shaping and conditioning circuits 20. The sine signal on line 18a and cosine signal on line 18b are both split upon coming in and feed inverters 130 and 132 respectively. The signal from inverter 130 is shown feeding inverter gates delineated as element 134. This inverter element 134 is a 74HO4 integrated circuit which consists of 6 gates. Only 3 of the inverters are shown as gate 134 but actually all 6 gates are tied together in the actual circuitry. The symbolic references of 136, 138 and 140 actually are 6 inverters in parallel similar to inverter section 134. The sine signal on line 18a is fed directly into the inverter driver 136 and the cosine signal on line 18b is fed directly into the inverter driver 140. These signals are then shaped through the inverter gates 134, 136, 138 and 140 and the resistor elements 142, 144, 146 and 148. The sine excitation signal is developed on line 22a and the cosine excitation signal is developed on line 22b. This signal is then fed into the balance board which is shown in FIG. 4.

Figure 4:
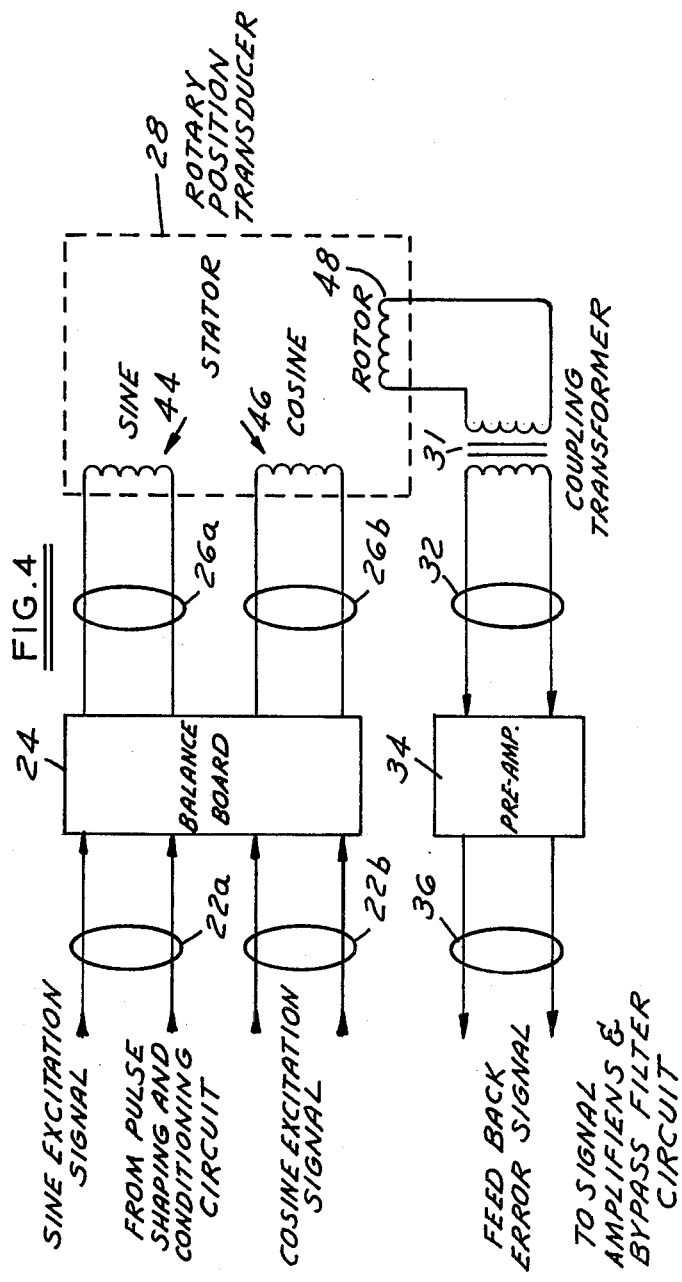
FIG. 4 is the circuit diagram and interconnections between the balance board, the rotary position transducer and the pre-amplifier.

Referring now to FIG. 4, the balance board 24, transducer unit 28, the coupling transformer 31 and the preamp 34 are commercially available items which are manufactured by the Farand Controls Company in Valhalla, N.Y. The function of the balance board 24 is to accept the incoming sine cosine excitation signals on line 22a and 22b and allow for adjustment of the current in each leg of the stator of the inductosyn unit 28. That is, the current of the signal that is going into the sine stator 44 through line 26a will be balanced so that it equals the cosine stator 46 current signal which is sent across lines 26b. This is necessary to obtain an accurate positioning of plus or minus one count over the entire 1,000 counts of one rotary transducer cycle. The rotational movement of the transducer rotor 48 senses the difference between the servo motor 14 rotation and the field generated in the stators 44, 46. This input to the pre-amp 34 is an error signal of approximately 100 millivolt from the rotor. The difference signal developed passes through coupling transformer 31 through line 32 and into the pre-amp 34 which does three things. The pre-amp 34 filters the signal, removing any harmonics to insure that only the 10 KHz frequency will pass; it then amplifies the 100 millivolt signal providing a strong signal for the feedback line 36; and it converts the signal, in conjunction with the coupling transformer 31, into an analog sine wave which is then fed to the signal amplifiers and the band pass filter elements 38 best seen in FIG. 3.

Figure 3:
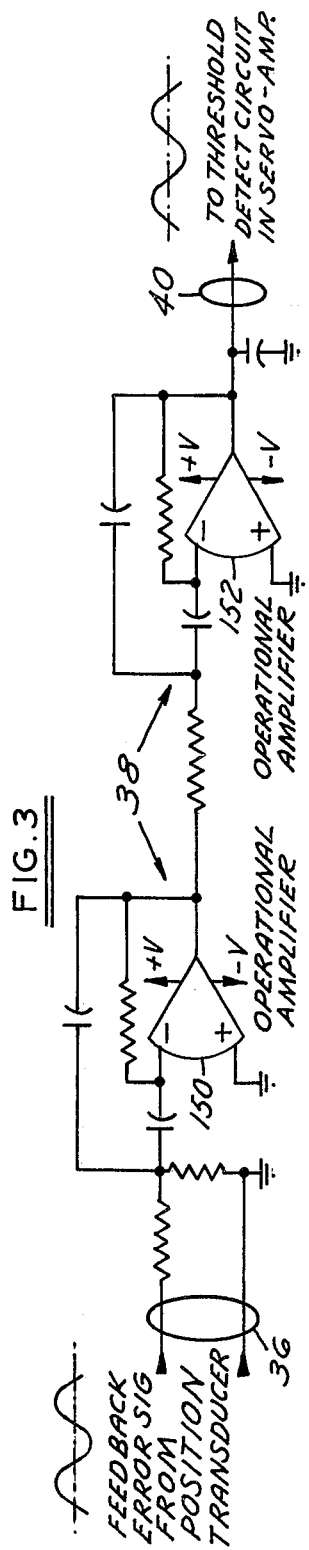
FIG. 3 is a circuit diagram of the band pass and filter amplifiers.

FIG. 3 shows the signal amp and band pass filter element 38 in a little more detail. The error signal from line 36 is fed into operational amplifier 150 which is cascaded with operational amplifier 152 to produce a signal on line 40. The purpose of this circuit is to again filter out any unfiltered harmonics which had passed through the pre-amp 34 and then to only pass those signals in the frequency range from 9.5 to 10.5 KHz. The signal which ultimately reaches line 40 is then amplified approximately 5 times. The amplification here is very important because the higher the peak to peak voltage swing of the error signal the more stable and accurate the detection of the rotary transducer zero crossing point will be. This zero crossing defines the beginning or ending of each electrical cycle of the transducer 28 as was stated earlier. With this conditioning of the error signal, the transducer 28 is able to transmit a more accurate positioning information signal to the threshhold detector circuit inside the servo amplifier. The signal on line 40 is fed into the pulse control circuit as seen in FIG. 1.

OPERATION

Viewing now FIGS. 1 and 2, the initializing signal from the clock generator 50 will preset or initialize all of the counters, flip-flops, and circuits in the various networks in the unit. The clock signal that is generated in the servo amp 10 will input the quadrature phasing network 16 on line 15 and generate the sine and cosine phase related signals on line 18. As described earlier these signals are square waves at this point which are changing each 500 counts and are phased so that they represent a sine cosine function with relationship to each other. These signals are conditioned, shaped and then balanced to provide equal current flow which is fed into the rotary transducer 28. As can be seen in FIG. 4, the transducer 28, is a two coil stator with a rotor output. The sine cosine functions will produce a magnetic field in the stators 44, 46 which will then, by induction, be coupled to the rotor 48. The variation or difference between the coupled signal in the rotor and the position of the rotor is established with respect to the stator windings. This signal developed in the rotor of the rotary transducer is shifted from the original zero crossing by rotation of the rotary transducer rotor 48 and will start pulses going out of the pulse control modual 64 in FIG. 1. This feedback signal goes through a zero crossing once every cycle per each cycle of the excitation. That phase relationship is the critical factor which determines the direction of the up-down control 66 and the remaining operation of the unit. The clock signal, referring now to FIG. 1, goes into counter no. 1, element 60, as well as to the pulse control 54 and multiplexer 70. The feedback signal which ultimately operates the up-down control 66 will feed counter no. 2, element 68. The counter no. 1 (60) and no. 2 (68) are both fed into comparator 62 which produces the signal which allows the pulse control circuit 64 to continue operating. When the counters 60 and 68 compare, the flow of pulses out of the pulse control 64 will stop which indicates that the phase relationship between the position of the rotary transducer and the clocking pulse are zero. The counter 68 is actually the element that tracks the rotary position. It can be seen that the pulse control 64 circuitry, examines the point of comparison of comparator 62 with the zero crossing point of the 10 KHz sine wave or 1,000 cycle count which is coming from the signal amp and band pass filter on line 40. As those two signals are being compared, the up-down control 66 is following the rotary transducer signal and feeding counter no. 2 (68) and the multiplexer. The phase relationship of the feedback signal ultimately continues or stops the pulse control 64 from feeding the up-down control. The up-down control signal, which is then fed into the multiplexer 70, conditioned with a command signal on line 72, then feeds counter no. 3, element 74. This signal then is a representation of the following error or the difference between the number of pulses that have come in on the command signal line subtracted from the number of pulses that have been developed through the feedback system from the transducer. Thus, the count at any time in counter no. 3 (74) is the following error or the number of pulses in backlog that have yet to be executed. This backlog will depend on the speed at which the motor is operating and is fed into the D/A converter 76 where the signal is converted into an analog signal and fed on line 78 to the servo drive amp 12. This signal will operate as a positive or negative signal from 0 to 10 volts DC. The tachometer 30 feeding on line 42 to drive power amp 12 which then feeds line 13 into the servo motor 14 is a fairly straightforward servo feedback system and will not be discussed in detail. What can be appreciated here is that the sensitivity of the system has been extended now so that the accurate positioning of the servo motor shaft will be greater by an order of magnitude over the existing equipment in the field. This improved output as used in a machine tool application will give a far more accurate positioning to machine tool elements which are connected to it. The error signal of this system is far more sensitive and far more accurate because of the conditioning and close circuit controls to give the output required. In addition to the preset circuits which were not included for simplicity reasons, there are also current limiting circuits and frequency sensitive elements which would shut down the system in the event of a malfunction within the electronic circuitry so as not to cause the unit to destroy itself by overdriving the drive motor or the elements feeding the servo drive motor.

In summary then, our invention comprises an apparatus for accurately controlling the axial position of a high speed position control system having a servo motor which is fed by a servo amplifier, drive amplifier means and a tachometer feedback to the drive amplifier. A high frequency quadrature phasing network receives a timing signal from the servo amplifier and conditions this signal into a balanced sine cosine function which excites the rotary position transducer. The position transducer or inductosyn is directly coupled to the motor and from the high frequency sine cosine signal produces a reference feedback signal. The rotor of the inductosyn senses the difference between its actual position and the sine cosine field of the stator and develops an error signal which is fed back to the servo amplifier. The error signal from the rotor is conditioned through a transformer, pre-amp and filter means and then fed into the servo amplifier means.

Although the preferred embodiment has been described and illustrated, it is understood that minor changes in the construction may be made within the scope of this invention without departing from the spirit of it.

I claim:

1. An apparatus for controlling the rotary shaft position of a high speed position control system having a servo-amplifier means and drive amplifier means, a servo-motor with a tachometer feedback means and rotary position feedback means, the improvement comprising a high frequency phasing network means receiving a timing signal from said servo-amplifier means, a pulse shaping, conditioning and balancing network means connected to said rotary position means, a conditioning feedback network means feeding a control signal to said servo-amplifier, said servo-amplifier means processing said timing signal and said feedback control signal to develop an internal control signal which is processed with said timing signal and a command signal to produce a drive signal for said drive amplifier means.

2. The apparatus of claim 1 wherein said phasing network means comprises a counter means having multiple stages and a decoding stage to develop two chains of pulses shifted in phase relationship with each other which feed said shaping, conditioning and balancing network means which produce two bipolar signals to excite the stators in said rotary position means, said one chain of pulses exciting one of said stator coils and said other chain of pulses exciting the other said stator coil wherein the phase relationship between them is at least 90°.

3. The apparatus of claim 1 or 2 wherein the angular position of said servo motor is fed back to said servo amplifier through a signal amplifier and filter means having a phase detector means and is phased with said timing signal to produce a tracking signal which is used to time and control the servo drive amplifier means.

4. The apparatus of claim 2 wherein the said chains of pulses exciting said rotary transducer are square wave signals which are modified in said conditioning circuit to approximate a sine wave.

5. The apparatus of claim 4 wherein the angular position of said servo motor is fed back to said servo amplifier through a signal amplifier and filter means having a phase detector means and a band pass frequency response of from 9.5 KHz to 10.5 KHz and is phased with said timing signal to produce a tracking signal which is used to time and control the servo drive amplifier means.

* * * * *